(12) United States Patent
Zhang et al.

(10) Patent No.: US 10,659,670 B2
(45) Date of Patent: May 19, 2020

(54) MONITORING SYSTEM AND CONTROL METHOD THEREOF

(71) Applicant: Sony Corporation, Tokyo (JP)

(72) Inventors: Deng Zhang, Beijing (CN); Kun Liu, Beijing (CN); Xiong Yin, Beijing (CN); Liang Li, Beijing (CN)

(73) Assignee: SONY CORPORATION, Tokyo (JP)

( * ) Notice: Subject to any disclaimer, the term of this patent is extended or adjusted under 35 U.S.C. 154(b) by 517 days.

(21) Appl. No.: 14/705,053

(22) Filed: May 6, 2015

(65) Prior Publication Data

US 2015/0326832 A1    Nov. 12, 2015

(30) Foreign Application Priority Data

May 12, 2014    (CN) .......................... 2014 1 0197939

(51) Int. Cl.
| | |
|---|---|
| *H04N 7/18* | (2006.01) |
| *H04N 5/232* | (2006.01) |
| *G06K 9/00* | (2006.01) |
| *H04N 5/247* | (2006.01) |
| *G06T 7/33* | (2017.01) |

(52) U.S. Cl.
CPC ......... *H04N 5/232* (2013.01); *G06K 9/00302* (2013.01); *G06K 9/00342* (2013.01); *G06K 9/00355* (2013.01); *G06K 9/00771* (2013.01); *G06T 7/337* (2017.01); *H04N 5/23216* (2013.01); *H04N 5/247* (2013.01); *H04N 7/181* (2013.01); *H04N 7/188* (2013.01); *G06K 2209/21* (2013.01); *G06K 2209/27* (2013.01); *G06T 2207/10004* (2013.01); *G06T 2207/10016* (2013.01); *G06T 2207/30196* (2013.01); *G06T 2207/30201* (2013.01); *G06T 2207/30232* (2013.01)

(58) Field of Classification Search
CPC ...... G06T 2207/30196; G06K 9/00771; H04N 5/232
See application file for complete search history.

(56) References Cited

U.S. PATENT DOCUMENTS

| | | | | |
|---|---|---|---|---|
| 6,909,458 B1* | 6/2005 | Suzuki | ............... | H04N 5/23203 348/159 |
| 2008/0292144 A1* | 11/2008 | Kim | .................. | G06K 9/00604 382/117 |
| 2012/0293773 A1* | 11/2012 | Publicover | ............. | A61B 3/113 351/210 |
| 2013/0044129 A1* | 2/2013 | Latta | ........................ | G09G 5/00 345/633 |
| 2013/0100231 A1* | 4/2013 | Wang | ..................... | H04N 7/142 348/14.01 |
| 2014/0028704 A1* | 1/2014 | Wu | .................... | G02B 27/0176 345/619 |

* cited by examiner

*Primary Examiner* — Zhubing Ren
(74) *Attorney, Agent, or Firm* — Xsensus LLP (57) ABSTRACT

The disclosure relates to a monitoring system and a control method for a monitoring system. The monitoring system includes a camera device, an object recognizing device and an arrangement control device. The camera device includes at least one movable camera device. The object recognizing device is configured to recognize a target object based on a primary image captured by the camera device. The arrangement control device is configured to control the spatial arrangement of the movable camera device so that the movable camera device is located at a predetermined position relative to the target object.

19 Claims, 6 Drawing Sheets

MONITORING SYSTEM AND CONTROL METHOD THEREOF

FIELD OF THE INVENTION

The disclosure generally relates to the field of video monitoring, and more particularly to a monitoring system including a movable camera device and to a control method for a monitoring system.

BACKGROUND OF THE INVENTION

There already exists a monitor system formed by multiple camera devices, in which each camera device may have a respective monitor area, or the multiple camera devices may provide image data of a same monitor area obtained from different viewing angles respectively. Such monitoring system can monitor a target area by capturing images with the multiple camera devices.

SUMMARY OF THE INVENTION

A brief overview regarding embodiments of the invention is given in the following, to provide a basic understanding of some aspects of the invention. It should be understood that the following overview is not an exhaustive overview of the invention. The overview neither intends to identify critical or essential parts of the invention, nor intends to limit the scope of the invention. It just aims at giving some concepts in a simplified form as a preamble of the more detailed description discussed later.

According to an aspect of the disclosure, it provides a monitoring system. The monitoring system includes a camera device, an object recognizing device and an arrangement control device. The camera device includes at least one movable camera device. The object recognizing device is configured to recognize a target object based on a primary image captured by the camera device. The arrangement control device is configured to control the spatial arrangement of the movable camera device so that the movable camera device is located at a predetermined position relative to the target object.

According to another aspect of the disclosure, it provides a control method for a monitoring system. The method includes a step of capturing a primary image by a camera device, where the camera device includes at least one movable camera device. The method further includes a step of recognizing a target object based on the captured primary image. The method further includes a step of, in a case that the target object is recognized, controlling the spatial arrangement of the movable camera device so that the movable camera device is located at a predetermined position relative to the target object.

With the embodiments of the invention, a predetermined target can be emphatically monitored by the monitoring system, thereby improving the directiveness and accuracy of monitoring results.

BRIEF DESCRIPTION OF THE DRAWINGS

With reference to the following description given in combined with the accompany drawings, the invention may be better understood. Same or similar reference numbers refer to same or similar components throughout the accompany drawings. The accompany drawings along with the following detailed description are included in the specification and form a part thereof, and they are further used to exemplify preferable embodiments of the invention and interpret the principle and advantages of the invention. In the accompany drawings.

DETAILED DESCRIPTION OF THE INVENTION

In the following, embodiments of the invention will be illustrated with reference to accompany drawings. Elements and features described in one drawing or one embodiment of the invention may be combined with elements and features illustrated in one or more other drawings or embodiments. It should be noted that, for the purpose of clarity, representation and description of components and processes, which are unrelated with the invention and have been known by those skilled in the art, are omitted in the accompany drawings and the specification.

Figure 1:
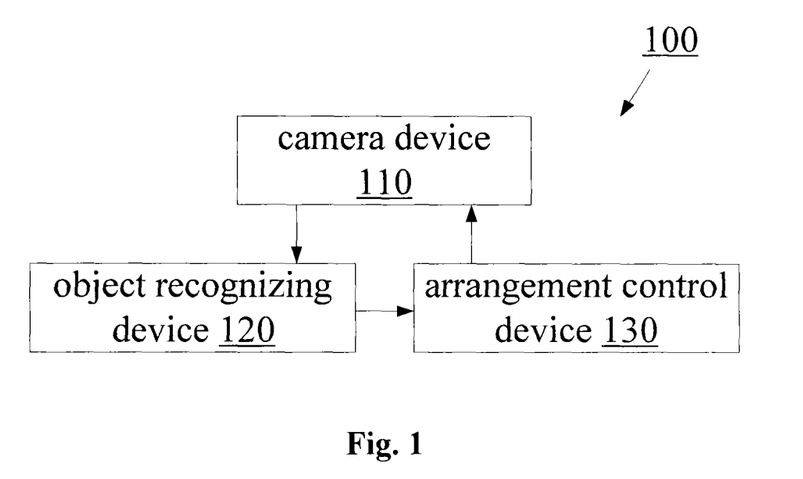
FIG. 1 is a block diagram showing an exemplary configuration of a monitoring system according to an embodiment of the invention.

As shown in FIG. 1, a monitoring system 100 according to an embodiment of the disclosure includes a camera device 110, an object recognizing device 120 and an arrangement control device 130.

Although the camera device 110 is represented with only one block in the drawing, the camera device 110 may be one or more camera devices including at least one movable camera device. In other words, the camera device 110 may be only one movable camera device, or the camera device 110 may be multiple camera devices including one or more movable camera devices.

Here, "the movable camera device" refers to a camera device whose position is movable. In addition, as mentioned in the following, "a fixed camera device" refers to a camera device whose position is fixed. The fixed camera device may include, for example, a fixed camera well-known in the art which is fixed on a fixed facility, such as a wall or a utility pole, within a monitor area. It should be noted that, although being referred to as a fixed camera device, the fixed camera device may still have a certain degree of freedom. For example, a shooting angle, a focal distance and the like of the fixed camera device may be changed. Accordingly, the fixed camera device may have different fields of view. On the contrary, a movable camera device is not fixed on a fixed facility, so its position can be changed as required in addition to having the degree of freedom in the shooting angle, the focal distance and the like.

Based on specific applications, the movable camera device may include various movable apparatus with a camera function. For example, the movable camera device may be, for example, a camera, a mobile phone and a wearable electronic apparatus such as smart glasses, which is hold or worn by a specific person and functions as the movable camera device as the person moves. Further, the movable camera device may also include a movable apparatus provided with a camera device, such as a telepresence robot known in the art which can move by means of a drive mechanism, such as wheels or rails, according to a control signal.

Still referring to FIG. 1, the object recognizing device 120 is configured to recognize a target object based on an image captured by the camera device 110. The object recognizing device 120 may recognize the target object in the image by various video-based object recognizing methods (for example, see SUN Bin "RESEARCH ON SUPPORT VECTOR MACHINE-BASED METHOD FOR RECOGNIZING VIDEO MONITORING MOVEMENT OBJECT", Modern Computer (Professional Edition), No. 24, 2011). According to specific applications, the object to be recognized may include, for example, an object in a specific form (such as a person, an animal, a vehicle, etc.), an object in a specific movement pattern (such as a moving object), and an object in a specific behavior pattern (such as a person performing a specific action or a combination of actions), etc.

The arrangement control device 130 is configured to control the spatial arrangement of the movable camera device, so that the movable camera device is located at a predetermined position relative to the target object recognized by the object recognizing device 120. Here, the predetermined relative position may include, for example, a predetermined distance, a predetermined viewing angle of the movable camera device relative to the target object, etc. In addition, the predetermined relative position is not limited to a specific distance and a specific viewing angle, and may also include, for example, a predetermined distance range, a predetermined viewing angle range, etc. The predetermined relative position may be set based on specific applications, so as to obtain an image of the target object captured from a specific viewing angle or has a specific definition, for example.

Based on different applications, the arrangement control device 130 may control the spatial arrangement of the movable camera device in different ways. For example, in a case where the movable camera device is hold or worn by a specific person, the arrangement control device 130 may provide a command of changing the spatial arrangement to the person (for example, via the movable camera device or other communication devices), to instruct the person to change the spatial arrangement of the movable camera device. Alternatively, in a case where the movable camera device has a drive mechanism itself or is attached to a movable apparatus, the arrangement control device 130 may provide a control command to the drive device or the movable apparatus.

With the monitoring system according to the embodiment, a desired monitoring image can be obtained by controlling the spatial arrangement of the camera device, for various purposes (such as identity recognition and behavior pattern recognition), even in a case that the target object moves or the relative position between the camera device and the target object does not satisfy predetermined requirements. Therefore, as compared with the existing monitoring system, the monitoring system according to the embodiment of the disclosure can make a predetermined target be emphatically monitored by means of the movable camera device based on the object recognition result, thereby improving the directiveness and accuracy of monitoring results.

According to a particular embodiment, the object recognizing device may be configured to recognize an object whose behavior pattern matches a predetermined behavior pattern as the target object. Accordingly, the arrangement control device may be configured to control the spatial arrangement of the movable camera device, so that the movable camera device is located at such a predetermined position relative to the target object that the similarity between the target object in an image captured by the movable camera device at the predetermined relative position and a model for pattern matching is higher than the similarity between the target object in an image on which the behavior pattern matching is performed by the object recognizing device and the model. Therefore, an image captured at an adjusted relative position may be utilized to perform the pattern matching with a higher accuracy. The pattern matching based object recognition may be performed in many ways, for example, see ZHANG Yiwei "RESEARCH ON BAHAVIOR PATTERN RECOGNITION BASED VEDIO MONITORING SYSTEM)", Master's Thesis in Huazhong University of Science and Technology, 2009.

More specifically, in case that the target object is a person, it may be determined whether the target object makes a specific behavior, for example, by detecting an action made by a specific part, such as the head or the four limbs, of the target object and by comparing the detected action with a predetermined model. For example, in an intelligent invigilation system, it is determined whether an examiner takes a cheating action or the like based on action recognition performed on the examiner. However, the behavior pattern recognition is not limited thereto, for example, a specific facial expression or the like may also be recognized from a facial image of a person.

By adjusting the spatial arrangement of the movable camera device, the movable camera device can obtain an image of the target object beneficial to perform pattern matching more accurately (for example, the posture of the target object in the obtained image is closer to the model for pattern matching in case that the behavior pattern is recognized based on the head and the four limbs of the target object, and a frontal view image of the face of the target object can be obtained in case that the facial expression is recognized), thereby improving the recognition accuracy of the object recognizing device.

Further, it should be noted that, although the camera device 110 and the object recognizing device 120 are shown as separate devices in FIG. 1, the camera device may be integrated with the object recognizing device according to some embodiments. For example, a mobile phone, a wearable smart apparatus such as the smart glasses, and a telepresence robot. etc., which serve as the movable camera device, may include a module having a camera function and an object recognition function simultaneously.

In the following, an exemplary configuration of a monitoring system according to another embodiment of the disclosure is illustrated with reference to FIG. 2.

Figure 2:
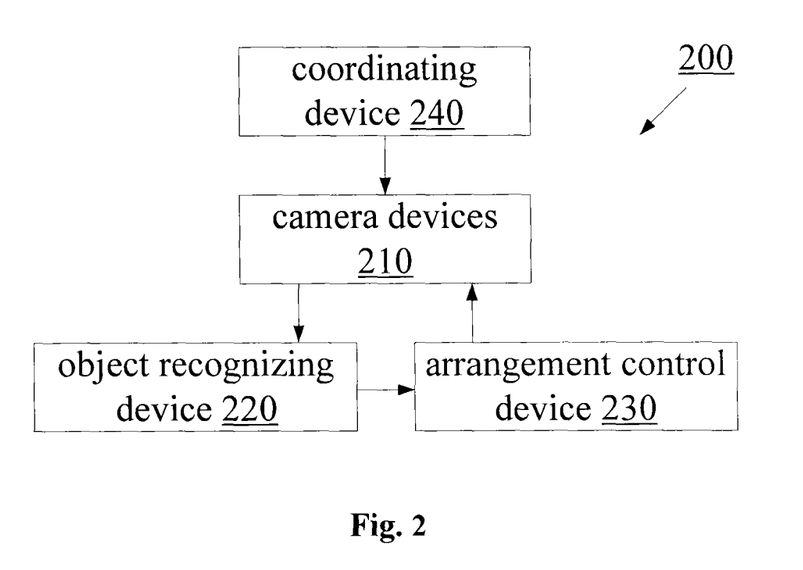
FIG. 2 is a block diagram showing an exemplary configuration of a monitoring system according to another embodiment of the invention.

As shown in FIG. 2, a monitoring system 200 according to the embodiment includes camera devices 210, an object recognizing device 220, an arrangement control device 230 and a coordinating device 240.

The camera devices 210 include two or more camera devices at least one of which is a movable camera device. In other words, in the embodiment, the camera devices 210 may include n movable camera devices and m fixed camera devices, where n≥1 and n+m≥2.

Similar to the object recognizing device 120 described above with reference to FIG. 1, the object recognizing device 220 in the monitoring system 200 according to the embodiment is configured to recognize a target object based on an image captured by the camera devices 210. The object recognizing device 220 may recognize the target object based on an image captured by the movable camera device, or may also recognize the target object based on an image captured by the fixed camera device (if any).

In addition, similar to the arrangement control device 130 described above with reference to FIG. 1, the arrangement control device 230 in the monitoring system 200 according to the embodiment is configured to control the spatial arrangement of the movable camera device, so that the movable camera device is located at a predetermined position relative to the target object recognized by the object recognizing device 220.

The coordinating device 240 is configured to, at the time of system initialization or in a case that the spatial arrangement of the movable camera device is changed, determine operation parameters of the camera devices 210 (which includes two or more camera devices), so that a union of monitor ranges of the camera devices covers a predetermined monitor target area.

According to a particular embodiment, the operation parameter of the movable camera device may include, for example, a position (which may include a position in a horizontal direction, i.e., two dimensional coordinates, and a position in a vertical direction, i.e. the height, etc.); an azimuthal angle (which may include a trim angle (a rotation angle around a horizontal axis) and a aspect angle (a rotation angle around a vertical axis)); a range of viewing angle (for example, wide angle or non-wide angle); and a focal distance (for example, the field of view is adjusted by scaling the field of view). The operation parameter of a fixed camera device may include, for example, an azimuthal angle, a range of viewing angle and a focal distance.

Next, coordination control between the multiple camera devices is schematically illustrated in the following example.

Assuming that the predetermined monitor target area is indicated as R=[x, y, w, h], where (x, y) are coordinates of a reference point of the monitor target area, w is the width of the monitor target area (in the top view), and h is the height of the monitor target area.

Assuming that there are m fixed camera devices and n movable camera devices in the system and it is expected to divide the monitor target area into n movable camera device sub-areas $R_i$, $i \in [0, n-1]$ and m fixed camera device sub-areas $R_j$, $j \in [0, m-1]$. For ease of illustration, it is assumed that the monitor target area is divided uniformly at the time of initialization, that is:

$$R_i = [x + i \times w/n, y + i \times h/n, w/n, h/n],$$

$$R_j = [x + j \times w/m, y + j \times h/m, w/m, h/m].$$

For each of the movable camera devices, it is assumed that the operation parameters, including the position ($C_{ix}$, $C_{iy}$), the height $C_{ih}$, the trim angle $C_{it}$, the aspect angle $C_{id}$, the range of viewing angle ($C_{iw}$, $C_{ip}$) and the focal distance $f_i$, of the movable camera device are initialized as follows:

$$C_{ix} \in [x + i \times w/n, x + (i+1) \times w/n],$$

$$C_{iy} \in [y + i \times h/n, y + (i+1) \times h/n],$$

$$C_{ih} \Sigma [1.5, 5.0] \text{(unit: meter)},$$

$$C_{it}, C_{iw}, C_{ip}, C_{id} \in [0, \pi/2].$$

For each of the fixed camera devices, it is assumed that the operation parameters, including the trim angle $C_{jt}$, the range of viewing angle ($C_{jw}$, $C_{jp}$) and the focal distance of the fixed camera device are initialized as follows:

$$C_{jw}, C_{jt}, C_{jp} \in [0, \pi/2].$$

Based on the initialized operation parameters of the camera devices, actual monitor ranges $R_i$, $i \in [1, m]$ of the fixed camera devices and actual monitor ranges $R_j$, $j \in [1, n]$ of the movable camera devices in the current spatial arrangement may be estimated as follows:

$$R_{ix} = C_{ix} + C_{ih} \times \tan\left(C_{it} - \frac{C_{ip}}{2}\right) \times g(f_i),$$

$$R_{iy} = C_{iy} - \frac{C_{ih}}{\cos\left(C_{it} - \frac{C_{ip}}{2}\right)} \times \tan\left(\frac{C_{iy}}{2}\right) \times g(f_i),$$

$$R_{iw} = 2 \times \frac{C_{ih}}{\cos\left(C_{it} - \frac{C_{ip}}{2}\right)} \times \tan\left(\frac{C_{iy}}{2}\right) \times g(f_i),$$

$$R_{ih} = C_{ih} \times \left(\tan\left(C_{it} + \frac{C_{ip}}{2}\right) - \tan\left(C_{it} - \frac{C_{ip}}{2}\right)\right) \times g(f_i)$$

where $g(f_i)$ is the influence coefficient of the focal distance f on the monitor area.

Based on the monitor ranges estimated as above, a union of the monitor ranges of the camera devices may be calculated as:

$$S = (\cup R_i, i \in [1, M]) \cap (\cap R_j, j \in [1, N]).$$

The operation parameters of the movable camera devices and the operation parameters of the fixed camera devices may be adjusted until S≥R is satisfied. The above operation parameters may be determined with an optimization algorithm, for example, by being modeled as a knapsack problem.

It should be noted that, the example described above is just illustrative, and those skilled in the art can determine the specific configuration and operation mode of the coordinating device depending on the specific camera devices applied and specific monitor areas, to make the union of the monitor ranges of the camera devices cover the predetermined monitor target area by adjusting the operation parameters of the camera devices, thereby implementing complete coverage of the monitor target area.

Further, as previously mentioned, in addition to performing the above coordination process at the time of system initialization, the coordinating device may also adjust the operation parameters of the camera devices (which may include the movable camera device or the fixed camera device) in a case that the spatial arrangement of the movable camera device is changed (for example, under the control of the arrangement control device), so that the union of the monitor ranges of the respective camera devices covers the monitor target area. The change in the spatial arrangement of the movable camera device may be determined in many ways. For example, the movable camera device may be provided with a position determination device, or the movable camera device may be configured to report information on the change in the spatial position to the monitoring system in case that the spatial arrangement is changed, etc.

With the above embodiment, it is ensured that the predetermined monitor target area can be completely covered while a specific target object can be emphatically monitored, so as to avoid omitting other target objects within the monitor area while a specific target object is emphatically monitored.

Figure 3:
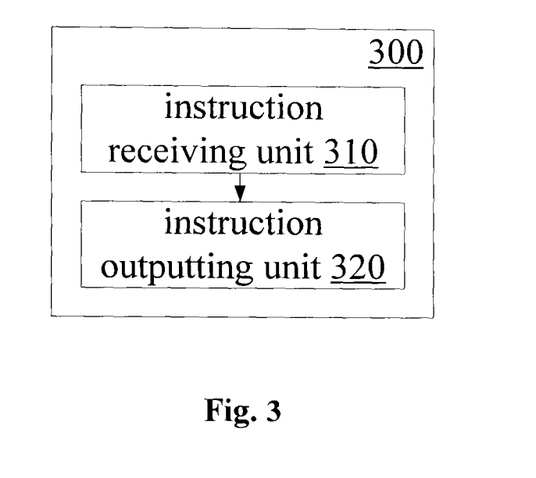
FIG. 3 is a block diagram showing an exemplary configuration of smart glasses as an example of a movable camera device in a monitoring system according to an embodiment of the invention.

As previously mentioned, the movable camera device may include a wearable apparatus such as smart glasses. FIG. 3 illustrates a block diagram showing an exemplary configuration of smart glasses as an example of the movable camera device in the monitoring system according to the embodiment of the disclosure.

As shown in FIG. 3, the smart glasses 300 include an instruction receiving unit 310 and an instruction outputting unit 320.

The instruction receiving unit 310 is configured to receive a spatial arrangement control instruction from the arrangement control device. The instruction outputting unit 320 is configured to output information corresponding to the received spatial arrangement control instruction to of a person wearing the smart glasses 300. The information corresponding to the spatial arrangement control instruction may include, for example, coordinates of a target position to which the movable camera device is to be moved and a viewing angle to be reached, or may also include a direction of movement and a distance which are determined from the current position and a target position.

It should be noted that, in addition to the smart glasses, the configuration is also applicable for other movable camera devices capable of being hold or worn by a predetermined person, such as a mobile phone and other wearable electronic apparatuses.

Figure 4:
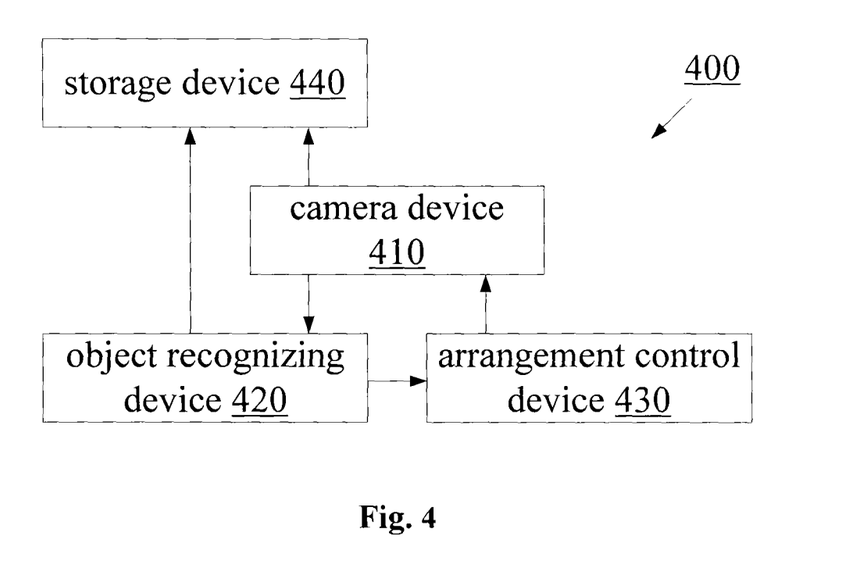
FIG. 4 is a block diagram showing an exemplary configuration of a monitoring system according to yet another embodiment of the invention.

Next, an exemplary configuration of a monitoring system according to yet another embodiment of the disclosure is illustrated with reference to FIG. 4.

A monitoring system 400 includes a camera device 410, an object recognizing device 420, an arrangement control device 430 and a storage device 440.

Configurations of the camera device 410, the object recognizing device 420 and the arrangement control device 430 are similar to the configurations of the camera device 110, the object recognizing device 120 and the arrangement control device 130 described above with reference to FIG. 1, respectively.

The storage device 440 is configured to store a corresponding image captured by the camera device 410 in a case that the target object is recognized by the object recognizing device 420.

The storage device 440 may store a static image captured by the camera device 410 in case that the target object is recognized by the object recognizing device 420, for example, a representative one of the images including the target object may be stored. Alternatively, the storage device 440 may store a dynamic image (a video) captured by the camera device 410 in case that the target object is recognized by the object recognizing device 420, for example, a dynamic image during a period of time in which a predetermined behavior of the target object is included may be stored.

With the embodiment, a corresponding image is stored in case that a specific object is recognized, to allow key content of the monitoring to be stored with a relatively small storage space.

In the above description of the monitoring system according to the embodiments of the disclosure, some processes or methods are also disclosed in practice. In the following, these methods will be described without repeating some details discussed above.

Figure 5:
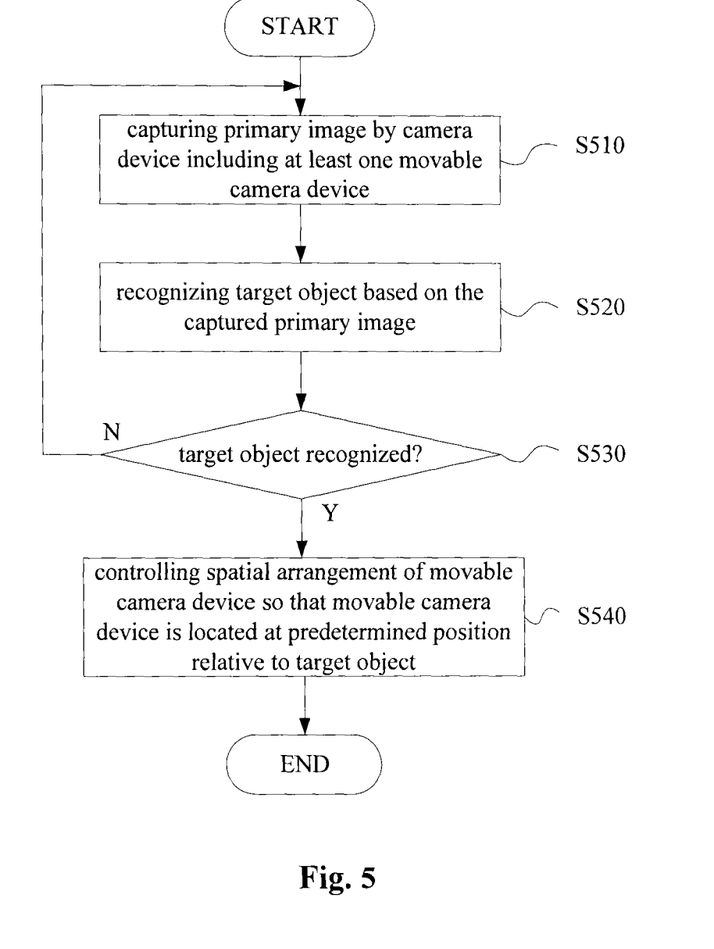
FIG. 5 is a flow chart showing an exemplary procedure of a control method for a monitoring system according to an embodiment of the invention.

As shown in FIG. 5, according to an embodiment of the disclosure, a control method for a monitoring system including at least one movable camera device includes the following steps.

In step S510, a primary image is captured by the camera device.

In step S520, a target object is recognized from the captured image.

In a case that the target object is recognized (Y in step S530), in step S540, the spatial arrangement of the movable camera device is controlled so that the movable camera device is located at a predetermined position relative to the target object.

The predetermined relative position may include, for example, a predetermined distance, a predetermined viewing angle, a predetermined distance range, or a predetermined viewing angle range of the movable camera device relative to the target object. The predetermined relative position may be set based on specific applications. For example, the predetermined relative position may be set so as to obtain an image of the target object captured from a specific viewing angle or at a specific definition.

With the embodiment, the directiveness and accuracy of monitoring results can be improved by emphatically monitoring a predetermined target.

According to an embodiment, the step of recognizing a target object includes: recognizing an object whose behavior pattern matches a predetermined behavior pattern as the target object. Accordingly, according to an embodiment, in the step of controlling the spatial arrangement of the movable camera device, the spatial arrangement of the movable camera device may be controlled so that the similarity between the target object in an image captured by the movable camera device at the predetermined relative position and a model for pattern matching is higher than that between the target object in the primary image and the model.

By adjusting the spatial arrangement of the movable camera device, the movable camera device can obtain an image of the target object which is beneficial to a more accurate pattern matching, thereby improving the accuracy of object recognition.

Figure 6:
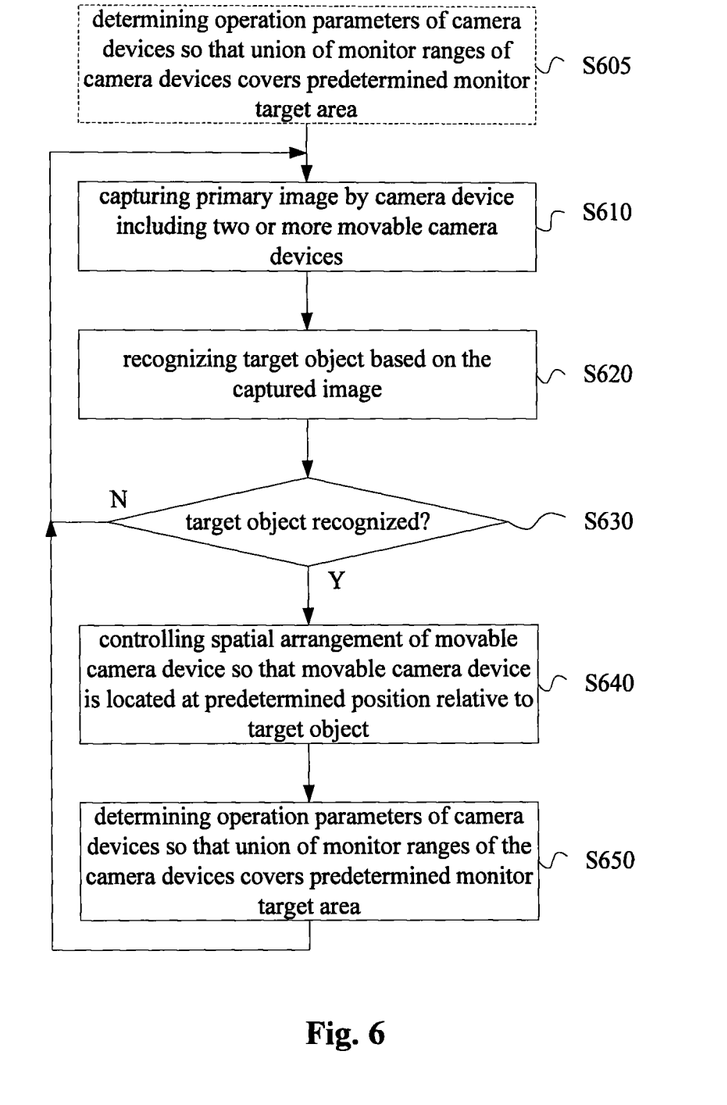
FIG. 6 is a flow chart showing an exemplary procedure of a control method for a monitoring system according to another embodiment of the invention.

As shown in FIG. 6, according to another embodiment of the disclosure, a control method for a monitoring system including two or more camera devices at least one of which is a movable camera device includes the following steps.

In step S610, a primary image is captured by the camera device.

In step S620, a target object is recognized from the captured image.

In a case that the target object is recognized (Y in step S630), in step S640, the spatial arrangement of the movable camera device is controlled so that the movable camera device is located at a predetermined position relative to the target object.

At the time of system initialization (S605) or in a case that the spatial arrangement of the movable camera device is changed (S650), operation parameters of the two or more camera devices are determined, so that a union of monitor ranges of the two or more camera devices covers a predetermined monitor target area.

With the embodiment, it is ensured that the predetermined monitor target area can be completely covered while a specific target object can be emphatically monitored, to avoid omitting other target objects within the monitor area while a specific target object is emphatically monitored.

According to an embodiment, the operation parameter of the movable camera device may include, for example, a position, an azimuthal angle, a viewing angle or a focal distance, etc. Further, the camera device may also include a fixed camera device, and the operation parameter of the fixed camera device may include, for example, an azimuthal angle, a range of viewing angle or a focal distance, etc.

As described above, the movable camera device may include smart glasses. Accordingly, according to an embodiment, the step of controlling the spatial arrangement of the movable camera device includes the steps shown in FIG. 7.

Figure 7:
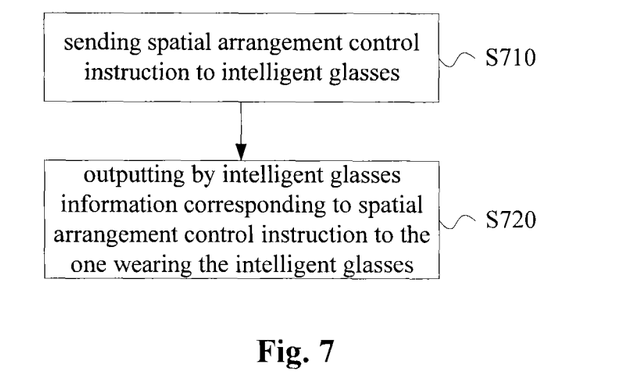
FIG. 7 is a flow chart showing an exemplary sub-procedure for controlling smart glasses as an example of a movable camera device.

As shown in FIG. 7, in step S710, a spatial arrangement control instruction is sent to the smart glasses; and in step S720, the smart glasses send information corresponding to the spatial arrangement control instruction (for example, coordinates of a target position to which the movable camera device is to be moved and a viewing angle to be reached, or a direction of movement and a distance which are determined from the current position and a target position) to the person wearing the smart glasses.

It should be noted that, in addition to the smart glasses, the process is also applicable for other movable camera devices capable of being hold or worn by a predetermined person, such as a mobile phone and other wearable electronic apparatuses.

Figure 8:
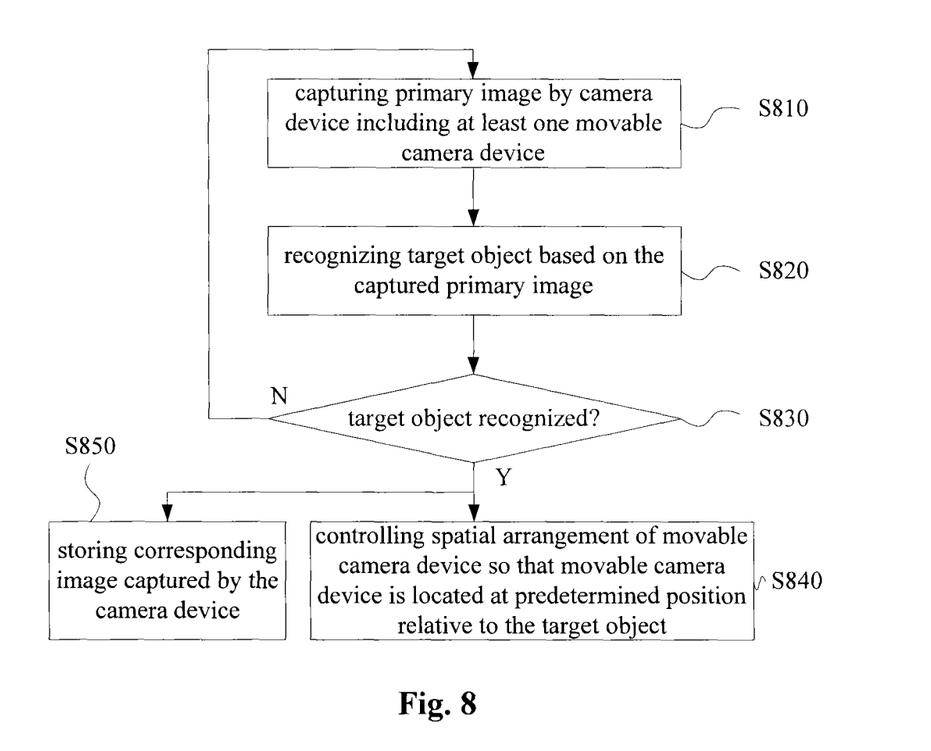
FIG. 8 is a flow chart showing an exemplary procedure of a control method for a monitoring system according to yet another embodiment of the invention.

As shown in FIG. 8, in a control method for a monitoring system according to an embodiment, steps S810 to S840 are similar to steps S510 to S540 illustrated with reference to FIG. 5 respectively, while the control method for the monitoring system according to the embodiment further includes:

In a case that the target object is recognized (Y in step S830), in step 850, storing a corresponding image captured by the camera device.

With the embodiment, a corresponding image is stored in case that a specific object is recognized, to allow key content of the monitoring to be stored with a relatively small storage space.

As an example, the individual steps of the above methods and the individual composition modules and/or units of the above devices may be embodied with software, firmware, hardware or a combination thereof. In a case that they are implemented with software or firmware, a program forming the software for executing the above method may be installed onto a computer having a specialized hardware structure (for example, a general purpose computer 900 shown in FIG. 9) from a storage medium or a network, in which the computer can execute various functions when installed with various programs.

Figure 9:
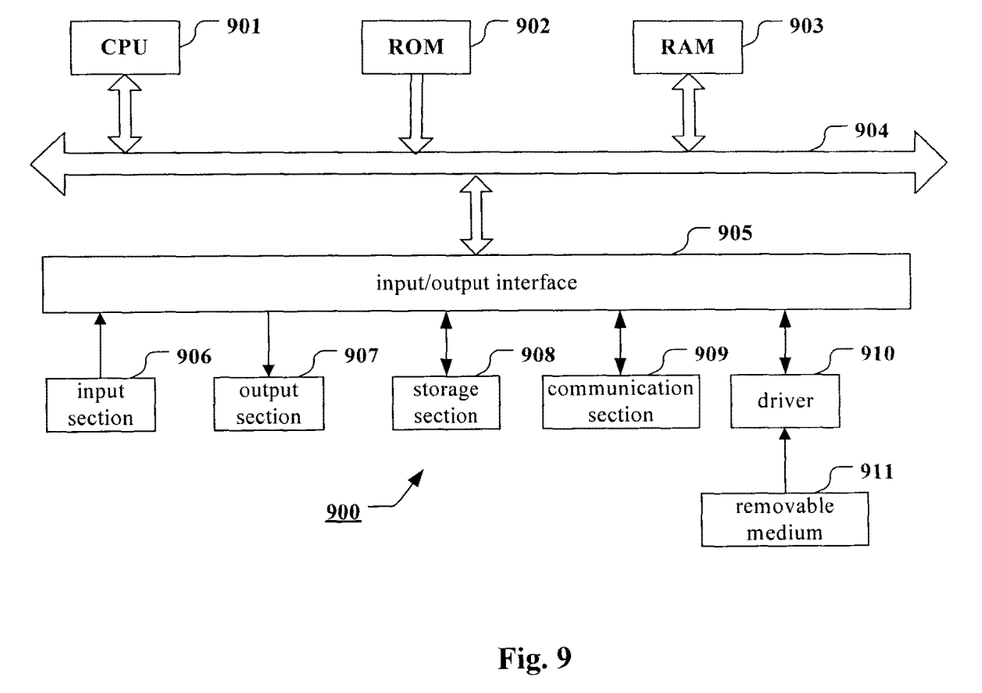
FIG. 9 is a block diagram showing an exemplary structure of a computer implementing the method and apparatus of the disclosure.

In FIG. 9, a center processing unit (i.e., CPU) 901 executes various processes based on programs stored in a read only memory (ROM) 902 or programs loaded from a storage section 908 to a random access memory (RAM) 903. In RAM 903, data required during the CPU 901 executes various processes is also stored as required. The CPU 901, the ROM 902 and the RAM 903 are linked to each other via a bus 904. An input/output interface is also linked to the bus 904.

An input section 906 (including a keyboard, a mouse and the like), an output section 907 (including a display such as a cathode ray tube (CRT) display and a liquid crystal display (LCD), a speaker and the like), the storage section 908 (including a hard disk and the like) and a communication section 909 (including a network interface card such as a LAN card, a modem and the like) are linked to the input/output interface 905. The communication section 909 executes communication processing via a network such as Internet. A driver 910 may also be linked to the input/output interface 905 as required. A removable medium 911, such as a magnetic disk, an optical disk, a magneto-optical disk and a semiconductor memory, is installed onto the driver 910 as required, so that a computer program read from the removable medium 911 is installed into the storage section 908 as required.

In a case that the series of processes described above are implemented with software, programs forming the software are installed from a network such as Internet or a storage medium such as the removable medium 911.

It should be understood by those skilled in the art that, such storage medium is not limited to the movable medium 911 shown in FIG. 9 which stores a program therein and is distributed separately from an apparatus to provide the program to a user. An example of the removable medium 911 includes a magnetic disk (including a floppy disk (registered trademark)), an optical disk (including a compact disc read only memory (CD-ROM) and a digital video disk (DVD)), a magneto-optical disk (including a minidisk (MD) (registered trademark)) and a semiconductor memory. Alternatively, the storage medium may be, for example, the ROM 902 or a hard disk included in the storage section 908, which store a program therein and is distributed to a user along with the apparatus including it.

The embodiment of the invention also relates to a program product having a machine-readable instruction code stored thereon. The instruction code, when being read and executed by a machine, can execute the above method according to the embodiment of the invention.

Accordingly, a storage medium for carrying the above program product having the machine-readable instruction code stored thereon is also included in the disclosure. The storage medium includes, but not limited to, a floppy disk, an optical disk, a magneto-optical disk, a memory card, a memory stick and the like.

In the above description of the particular embodiments of the invention, features described and/or illustrated in one embodiment may be used in one or more other embodiments in a same or similar manner, combined with features in other embodiments, or substitute features in other embodiments.

It should be noted that, the term "comprising/including", when being used herein, refers to the presence of a feature, an element, a step or a component, but does not exclude the presence or addition of one or more other features, elements, steps or components.

In the above embodiments and examples, reference numbers composed of numbers are adopted to indicate the individual steps and/or units. Those skilled in the art should understand that, these reference numbers are only adopted to facilitate the description and plotting, rather than indicating a sequence or any other limitation.

Further, the method according to the invention is not limited to be executed in the time sequence described in the specification, and may also be executed in other time sequences or be executed in parallel or separately. Therefore, the execution sequence of the method described in the specification does not limit the technical coverage of the invention.

Although the invention has been disclosed by means of the description of the particular embodiments, it should be understood that, all of the above embodiments and examples are exemplary rather than being restrictive. Various modifications, variations or equivalents of the invention may be made by those skilled in the art without departing from the spirit and scope of the appended claims. These modifications, variations or equivalents should also be considered as being included in the scope of protection of the invention.

The invention claimed is:

1. A monitoring system, comprising:
a camera device comprising at least one movable camera device and at least one fixed camera device; and
circuitry configured to
recognize a target object based on a primary image captured by the camera device,
recognize an object whose movement behavior pattern matches a predetermined behavior pattern as the target object,
control a spatial arrangement of the movable camera device so that the movable camera device is located at a predetermined position relative to the target object, and
determine operation parameters of the movable camera device and the fixed camera device so that a union of monitor ranges of the movable camera device and the fixed camera device covers a predetermined monitor target area.

2. The monitoring system of claim 1, wherein the circuitry is further configured to:
determine operation parameters of the movable camera device and the fixed camera device at the time of system initialization.

3. The monitoring system of claim 2, wherein the operation parameter of the movable camera device comprises: a position, an azimuthal angle, a range of viewing angle, and/or a focal distance.

4. The monitoring system of claim 1, wherein the similarity between the target object in an image captured by the movable camera device at the predetermined relative position and a model for pattern matching is higher than the similarity between the target object in the primary image and the model.

5. The monitoring system of claim 1, wherein the movable camera device comprises smart glasses.

6. The monitoring system of claim 5, wherein the smart glasses comprises circuitry configured to:
receive a spatial arrangement control instruction from the arrangement control device, and
output information corresponding to the received spatial arrangement control instruction to a wearer of the smart glasses.

7. The monitoring system of claim 1, further comprising a storage device configured to store a corresponding image captured by the camera device in response to the target object being recognized.

8. The monitoring system of claim 1, wherein the movable camera device comprises smart glasses, and wherein the system further comprises a storage device configured to store a corresponding image captured by the camera device in response to the target object being recognized.

9. The monitoring system of claim 1, wherein the movement behavior pattern includes a face image of the target object, and the predetermined position includes a predetermined distance to the target object.

10. The monitoring system of claim 1, wherein the circuitry is further configured to:
determine operation parameters of the movable camera device and the fixed camera device in response to a change in the spatial arrangement of the movable camera device.

11. A control method of a monitoring system, the method comprising:
capturing a primary image by a camera device comprising at least one movable camera device and at least one fixed camera device;
recognizing a target object based on the captured primary image;
recognizing an object whose movement behavior pattern matches a predetermined behavior pattern as the target object,
when the target object is recognized, controlling a spatial arrangement of the movable camera device so that the movable camera device is located at a predetermined position relative to the target object, and
determining operation parameters of the movable camera device and the fixed camera device so that a union of monitor ranges of the movable camera device and fixed camera device covers a predetermined monitor target area.

12. The method of claim 11, wherein determining operation parameters of the movable camera device and the fixed camera device further comprises:
determining operation parameters of the movable camera device and the fixed camera device at the time of system initialization.

13. The method of claim 12, wherein the operation parameter of the movable camera device comprises: a position, an azimuthal angle, a range of viewing angle, and/or a focal distance.

14. The method of claim 11, wherein the similarity between the target object in an image captured by the movable camera device at the predetermined relative position and a model for pattern matching is higher than the similarity between the target object in the primary image and the model.

15. The method of claim 11, wherein the movable camera device comprises smart glasses.

16. The method of claim 15, wherein controlling the spatial arrangement of the movable camera device comprises:
sending a spatial arrangement control instruction to the smart glasses; and
outputting, by the smart glasses, information corresponding to the spatial arrangement control instruction to a wearer of the smart glasses.

17. The method of claim 11, further comprising:
storing a corresponding image captured by the camera device in a case that the target object is recognized.

18. The method of claim 11, wherein the movement behavior pattern includes a face image of the target object, and the predetermined position includes a predetermined distance to the target object.

19. The method of claim 11, wherein determining operation parameters of the movable camera device and the fixed camera device further comprises:
determining operation parameters of the two or more camera devices in response to a change in the spatial arrangement of the movable camera device.

* * * * *